(12) United States Patent
Yasinski

(10) Patent No.: US 10,723,562 B2
(45) Date of Patent: Jul. 28, 2020

(54) AXIAL FLUX MOTOR FOR A CONVEYOR

(71) Applicant: Laitram, L.L.C., Harahan, LA (US)

(72) Inventor: Elena Rose Yasinski, San Francisco, CA (US)

(73) Assignee: Laitram, L.L.C., Haraham, LA (US)

( * ) Notice: Subject to any disclaimer, the term of this patent is extended or adjusted under 35 U.S.C. 154(b) by 0 days.

(21) Appl. No.: 16/463,109

(22) PCT Filed: Dec. 13, 2017

(86) PCT No.: PCT/US2017/066008
§ 371 (c)(1),
(2) Date: May 22, 2019

(87) PCT Pub. No.: WO2018/125562
PCT Pub. Date: Jul. 5, 2018

(65) Prior Publication Data
US 2019/0283972 A1    Sep. 19, 2019

Related U.S. Application Data

(60) Provisional application No. 62/439,710, filed on Dec. 28, 2016.

(51) Int. Cl.
*B65G 23/06* (2006.01)
*B65G 23/08* (2006.01)

(52) U.S. Cl.
CPC .............. *B65G 23/06* (2013.01); *B65G 23/08* (2013.01); *B65G 2812/02089* (2013.01); *B65G 2812/02148* (2013.01)

(58) Field of Classification Search
CPC ........ B65G 23/06; B65G 23/08; B65G 23/22; B65G 2812/02148; B65G 2812/02089
USPC ......................................... 198/805, 834, 835
See application file for complete search history.

(56) References Cited

U.S. PATENT DOCUMENTS

| | | | |
|---|---|---|---|
| 4,366,899 A | 1/1983 | Dor | |
| 4,681,215 A | 7/1987 | Martin | |
| 4,865,183 A | 9/1989 | Hodlewsky et al. | |
| 5,076,420 A | 12/1991 | Kuschel | |
| 5,253,748 A * | 10/1993 | Ledet | B65G 23/08 198/834 |
| 5,544,740 A * | 8/1996 | Kissee | F16D 1/0847 198/834 |
| 7,207,435 B2 * | 4/2007 | Bude | B65G 23/06 198/834 |
| 8,307,976 B2 * | 11/2012 | Kratz | B65G 39/02 198/788 |
| 9,227,785 B2 | 1/2016 | Chinnock et al. | |
| 2013/0256098 A1 | 10/2013 | Petack | |
| 2015/0083554 A1 | 3/2015 | Ragan et al. | |
| 2016/0101943 A1 | 4/2016 | Guerra | |

* cited by examiner

*Primary Examiner* — James R Bidwell
(74) *Attorney, Agent, or Firm* — Catherine M. Bishop

(57) ABSTRACT

A conveyor belt drive system comprises an axial flux motor. The axial flux motor comprises a stator and rotor bearing mounted on a stationary shaft. The stator drives a toothed rotor mounted on the rotor bearing. The rotor has a tubular shaft extension that mates with a drive shaft that can accommodate standard sprockets. Rotation of the rotor causes rotation of the drive shaft and sprockets to drive a conveyor belt.

11 Claims, 5 Drawing Sheets

AXIAL FLUX MOTOR FOR A CONVEYOR

RELATED APPLICATIONS

This application claims priority to U.S. Provisional Patent Application No. 62/439,710, filed Dec. 28, 2016, and entitled "Axial Flux Motor for a Conveyor", the contents of which are herein incorporated by reference.

BACKGROUND OF THE INVENTION

The invention relates generally to power-driven conveyors and more particularly to an axial flux motor for driving a conveyor belt drive system moving a conveyor belt through a circuit.

Conveyor belts are used to move articles, packages, food items, machine parts, and the like from one locale to another, such as within a factory, plant, manufacturing facility or the like. Conveyor belts generally use drive shafts on which drive pulleys or sprockets driving the conveyor belt are mounted. The drive shaft is conventionally rotated by a gear motor at one end of the shaft.

SUMMARY OF THE INVENTION

A conveyor belt drive system comprises an axial flux motor coupled to a drive shaft. The axial flux motor comprises a stator and a rotor having peripheral teeth driven by the stator. The rotor couples to a drive shaft for mounting additional traditional sprockets that are coupled to the shaft, so that driving the rotor causes the drive shaft and associated additional sprockets to rotate as well.

According to one aspect, a drive sprocket for a conveyor belt comprises a disc-shaped body having a plurality of circumferential teeth and a plurality of magnets arranged on the disc-shaped body and a connector extending from a first side of the disc-shaped body for connecting the disc-shaped body to a drive shaft.

According to another aspect, a drive system for a conveyor belt comprises a stationary shaft extending along a longitudinal axis, a stator mounted to the stationary shaft, a rotor rotatably mounted to the stationary shaft using a bearing and spaced from the stator by an air gap, a protrusion extending from the rotor for mounting a drive shaft, a drive shaft coupled to the protrusion and a sprocket coupled to the drive shaft.

DETAILED DESCRIPTION

A motor for driving a conveyor comprises a stator and a rotor bearing mounted on a stationary shaft. The stator drives an associated rotor that is mounted on the rotor bearing. The rotor mates with a drive shaft for mounting sprockets or other belt guiding devices. The invention will be described relative to certain illustrative embodiments, though the invention is not limited to those embodiments illustrated.

Figure 1:
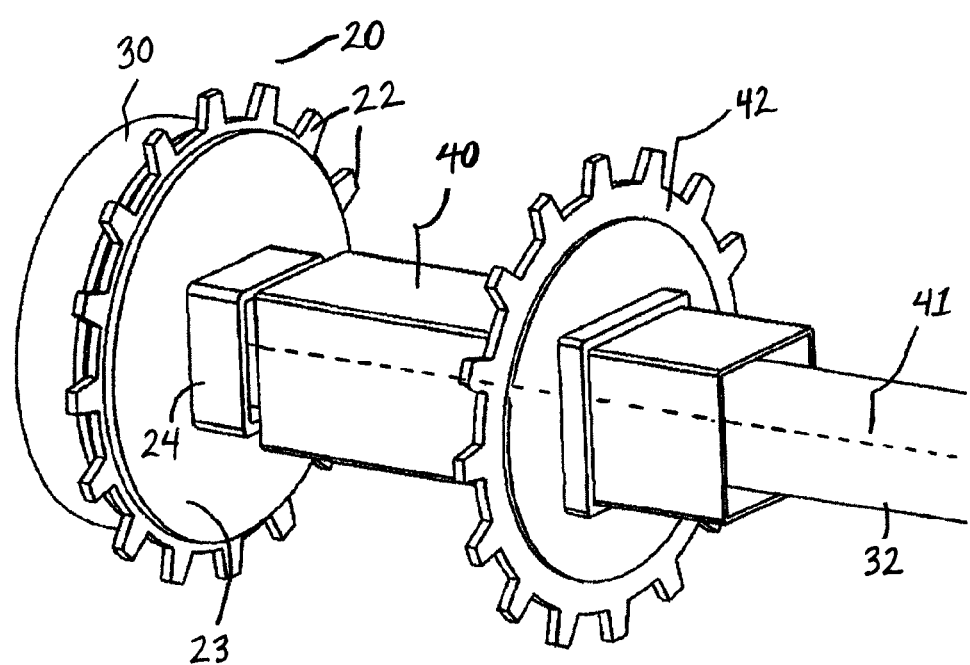
FIG. 1 is a partially exploded view of an assembled conveyor belt drive system of an embodiment of the invention.

FIG. 1 shows a conveyor-belt drive system embodying features of the invention. The drive system 10 includes a drive sprocket 20 driven by a driver 30 and coupled to a drive shaft 40 extending in length along a central axis 41. Another sprocket 42 is coupled to the drive shaft 40 and turns with it. Together, the drive sprocket 20 and the coupled sprocket 42 engage and support a conveyor belt. And, unlike with conventional end-driven drive shafts, a gearbox is not needed. The coupled sprocket 42 can be fixed along the axis of rotation of the drive shaft 40 or can be free to float.

Figure 2:
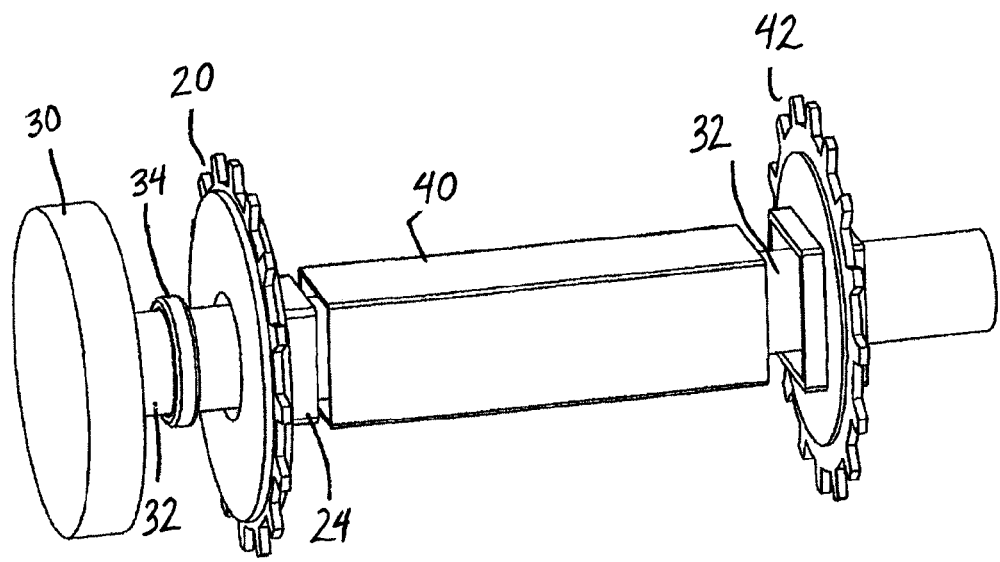
FIG. 2 is a partially exploded view of the conveyor belt drive system of FIG. 1.

The drive sprocket 20 comprises a permanent magnet rotor. The rotor includes a disc-shaped body 23 and peripheral teeth 22 circumferentially spaced along the outer surface of the body 23. The disc-shaped body 23 houses an array of permanent magnets or other components capable of creating a magnetic field. The driver 30 is a stator comprising an array of wound coils, separated from the drive sprocket 20 by an air gap. The stator is affixed to a stationary shaft 32 that extends through the rotor 20 and drive shaft 40. The stationary shaft 32 is mounted to the conveyor frame. As shown in FIG. 2, the stationary shaft 32 includes a bearing 34 for rotatably mounting the rotor 20 a select distance away from the stator 30.

When energized by a motor controller over electrical wiring, the stator 30 produces a magnetic flux wave that causes the permanent magnet rotor 20 to rotate about the axis 41 of the shaft 40, causing the teeth 22 to move in a circuit as well. Because the rotor 20 is coupled to the drive shaft 40, rotation of the rotor 20 causes the drive shaft 40 to also rotate, along with any additional sprockets 42 coupled to the drive shaft 40.

The connector for connecting the rotor 20 to the drive shaft 40 comprises a hollow protrusion extending along the central axis 41 for mating with the drive shaft 40. The illustrative hollow protrusion 24 comprises four walls forming a square shape that is slightly smaller than the inner opening of the shaft 40, so that the protrusion 24 can fit inside the shaft 40 to couple the drive shaft 40 to the rotor 20. Either the entire drive shaft may be hollow, or just the ends for receiving the connector are hollow. The drive shaft and rotor are thus connected so that rotation of the rotor about the central axis causes the drive shaft 40 to also rotate. Any suitable means for coupling the rotor and drive shaft may be used.

Figure 3:
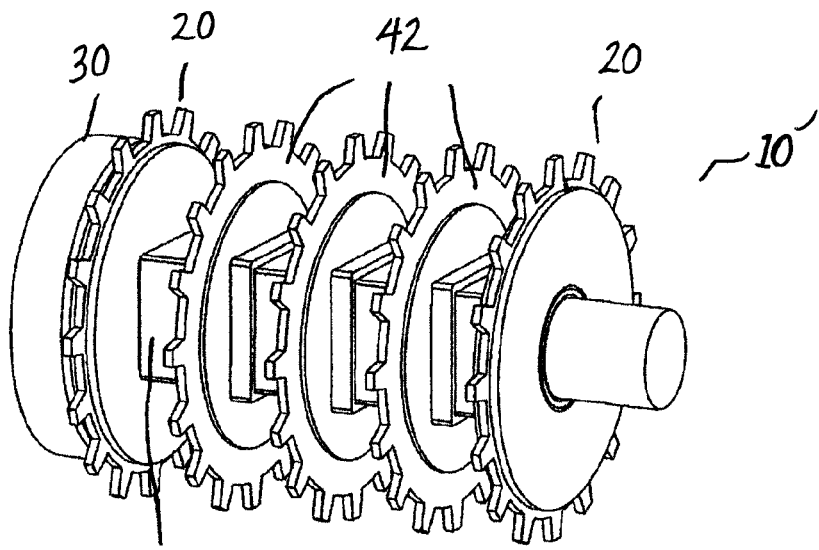
FIG. 3 is an isometric view of a conveyor belt drive system including a number of coupled sprockets at a relatively close spacing, according to one embodiment of the invention.
Figure 4:
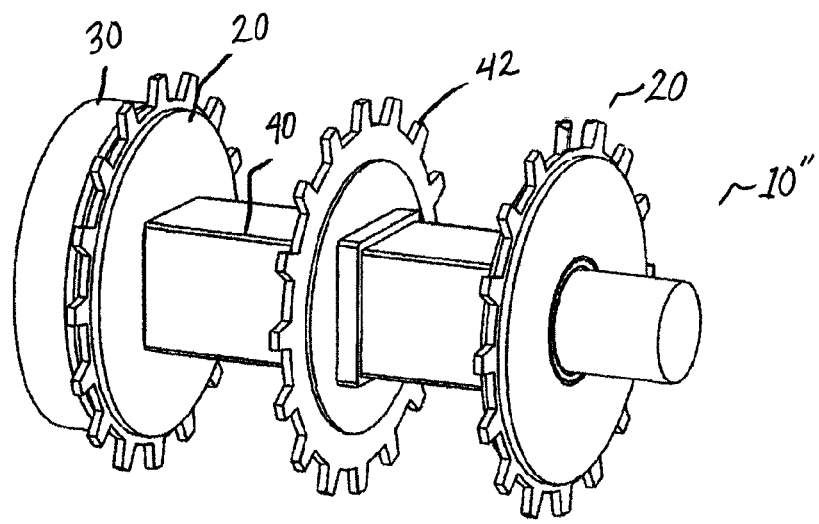
FIG. 4 shows a conveyor belt drive system including a larger spacing between sprockets.

As shown in FIGS. 3 and 4, a number of additional sprockets 42 can be coupled to the drive shaft 40 at any suitable spacing. FIG. 3 shows a conveyor drive system 10' employing a stator 30, rotor 20, a drive shaft 40 coupled to the rotor 20 and multiple additional sprockets 42 spaced every three or so inches on the drive shaft, while FIG. 4 shows a conveyor drive system 10" employing a stator 30, rotor 20, a drive shaft 40 coupled to the rotor 20 and an additional sprocket 42 spaced between rotors 20 six or so inches on the drive shaft 40.

Figure 5:
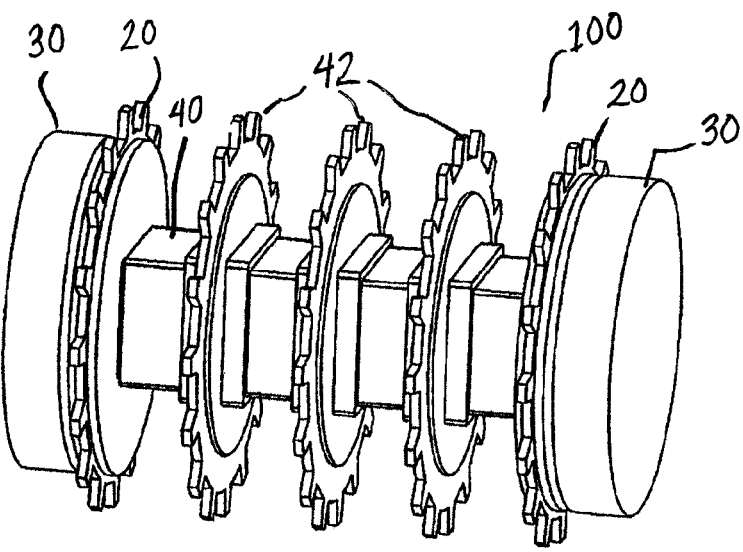
FIG. 5 shows a conveyor belt drive system including fixed stators at each end of a drive shaft.
Figure 6:
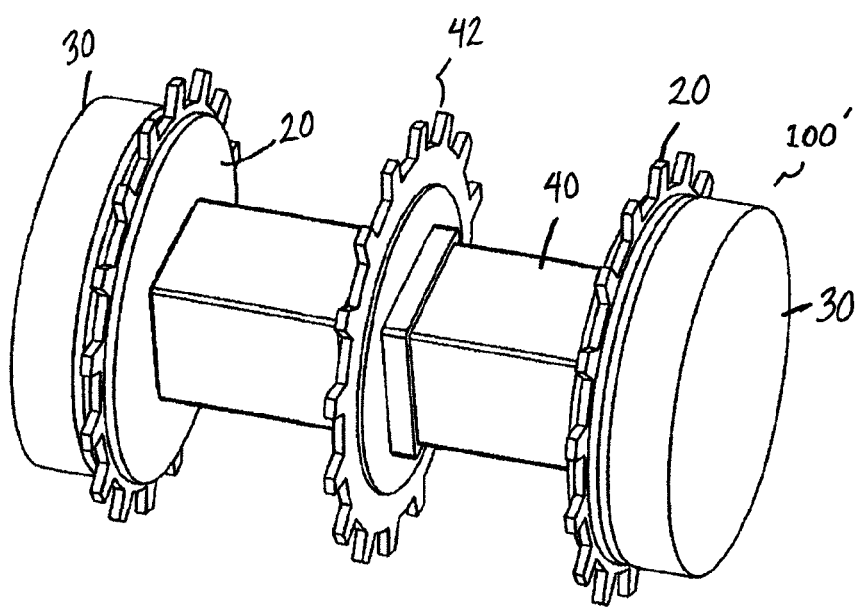
FIG. 6 shows a conveyor belt drive system including stators at each end of a drive shaft on which are mounted multiple idler sprockets.

As shown in FIGS. 5 and 6, a conveyor belt drive system 100 and 100' can include synchronized stators 30 and sprocket rotors 20 at each end of a drive shaft 40 upon which additional sprockets 42 are mounted.

Figure 7:
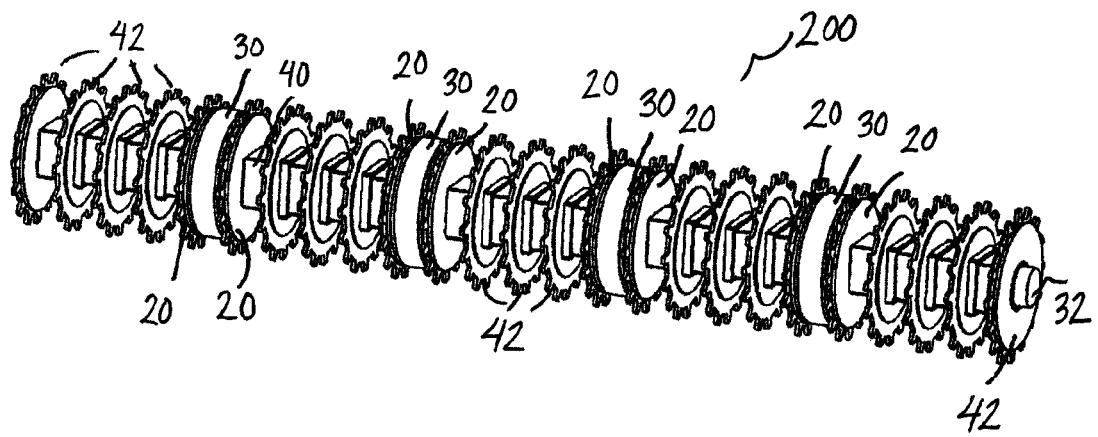
FIG. 7 shows a conveyor belt drive system of an embodiment of the invention including multiple stators and rotors.

As shown in FIG. 7, a conveyor belt drive system 200 can include multiple drivers along drive shaft segments 40'. Each driver comprises a stator 30 fixed to a stationary shaft 32, which is fixed to a conveyor frame at each end. A pair of rotors 20 with peripheral teeth are rotatably mounted to the stationary shaft and driven by each stator. One of the pair of rotors may be mechanically driven instead of electrically driven. The rotors 30 couple to the drive shaft segments 40, each of which mounts an array of additional sprockets 42. The stators and rotors are synchronized, so that the separate drive shaft segments turn in unison.

Figure 8:
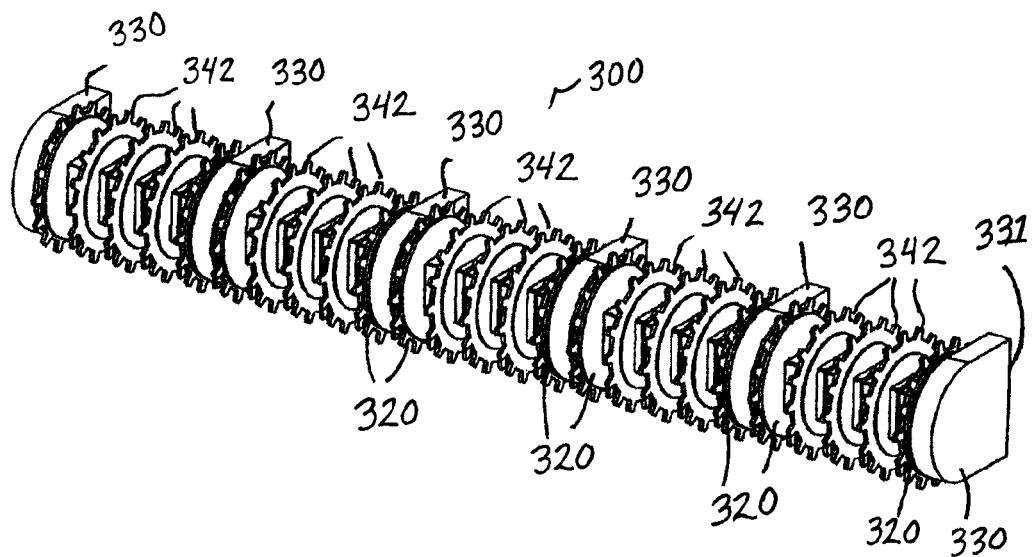
FIG. 8 shows a conveyor belt drive system of another embodiment of the invention.
Figure 9:
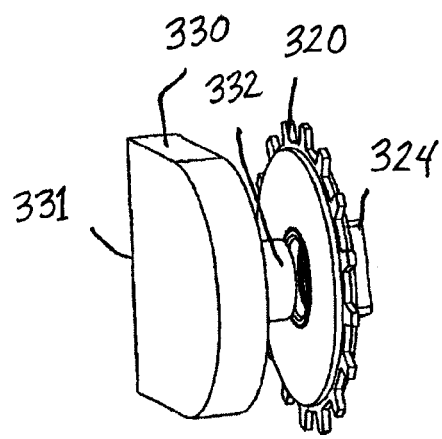
FIG. 9 is an exploded view of a stator and rotor of the conveyor belt drive system of FIG. 8.

According to another embodiment of the invention, a conveyor belt drive system 300, shown in FIGS. 8 and 9, can comprise multiple drivers, with each driver independently mounted to a conveyor frame. In the embodiment of FIG. 9, each stator 330 has a housing with a flat frame-facing end 331 for attachment to the frame. Each stator 330 drives one or more associated rotor 320, which in turn couples to a drive shaft upon which idler sprockets 342 are mounted using a coupler 324. Shaft-like protrusions 332 fixed to the stators support the rotors. The interior stators 330 include a shaft-like protrusion 332 extending from each side, to support multiple associated rotors, while the exterior stators 330 include an inward-facing protrusion 332 for coupling with an associated stator.

Any suitable number of stators, toothed rotors and additional sprockets may be used in any suitable configuration and spacing to form a conveyor belt drive system. The ability to use square drive shafts with an axial flux motor allow safe and economic transfer of torque to a conveyor belt in a distribute manner. Because each square tube section is relatively short, torsion and tooth misalignment is minimized. Tooth alignment along the entire shaft can be attained through motor control and synchronization.

So, as these few examples suggest, the scope of the claims is not meant to be limited by the details of the exemplary versions.

What is claimed is:

1. A drive sprocket for a conveyor belt, comprising:
   a disc-shaped body having a plurality of circumferential teeth and a plurality of magnets arranged on the disc-shaped body;
   an opening in the disc-shaped body having a bearing for rotatably mounting the disc-shaped body to a stationary shaft; and
   a hollow protrusion extending from a first side of the disc-shaped body for connecting the disc-shaped body to a drive shaft for driving additional sprockets fixed to the drive shaft.

2. The drive sprocket of claim 1, wherein the hollow protrusion has a square shape.

3. A drive system for a conveyor belt, comprising:
   a stationary shaft extending along a longitudinal axis;
   a stator affixed to the stationary shaft, the stationary shaft extending from a first side of the stator;
   a rotor rotatably mounted to the stationary shaft using a bearing and spaced from the stator by an air gap, the rotor including peripheral drive teeth for driving the conveyor belt;
   a hollow protrusion extending from the rotor for mounting a drive shaft;
   a drive shaft affixed to the protrusion, wherein the protrusion fits inside an end of the drive shaft and wherein the stationary shaft extends through the rotor, hollow protrusion and drive shaft; and
   a sprocket having peripheral drive teeth for driving the conveyor belt fixed to and rotatable with the drive shaft.

4. The drive system of claim 3, wherein the stationary shaft is mounted to a conveyor frame.

5. The drive system of claim 3, wherein the stator comprises an array of wound coils.

6. The drive system of claim 3, wherein the rotor comprises a disc-shaped body and an array of magnets.

7. The drive system of claim 3, wherein the protrusion comprises a hollow square protrusion.

8. The drive system of claim 7, wherein the drive shaft is a hollow square configured to receive the protrusion.

9. The drive system of claim 3, further comprising a plurality of sprockets spaced apart on the drive shaft.

10. The drive system of claim 3, further comprising a second stator mounted to the stationary shaft and a second rotor driven by the second stator.

11. The drive system of claim 3, wherein the stator is fixed to a conveyor frame.

* * * * *